United States Patent
Vahlbrauk

(10) Patent No.: US 7,712,795 B2
(45) Date of Patent: May 11, 2010

(54) PIPE CONNECTION

(76) Inventor: Wolfgang Vahlbrauk, Kriegerweg 6, 37581, Bad Gandersheim (DE)

( * ) Notice: Subject to any disclaimer, the term of this patent is extended or adjusted under 35 U.S.C. 154(b) by 0 days.

(21) Appl. No.: 12/252,433

(22) Filed: Oct. 16, 2008

(65) Prior Publication Data

US 2009/0102186 A1    Apr. 23, 2009

(30) Foreign Application Priority Data

Oct. 16, 2007   (DE) ................. 10 2007 049 996

(51) Int. Cl.
*F16L 21/02* (2006.01)
(52) U.S. Cl. .................. 285/340; 285/374; 285/367
(58) Field of Classification Search ............... 285/369, 285/420, 419, 403, 340, 367, 374
See application file for complete search history.

(56) References Cited

U.S. PATENT DOCUMENTS

| | | | | |
|---|---|---|---|---|
| 2,702,716 | A * | 2/1955 | Basolo et al. ............. | 285/369 |
| 4,664,422 | A | 5/1987 | Straub | |
| 6,328,352 | B1 * | 12/2001 | Geppert et al. ............ | 285/369 |
| 6,685,238 | B1 * | 2/2004 | Pouillard .................. | 285/420 |
| 6,692,042 | B2 * | 2/2004 | Barbett et al. ............. | 285/420 |
| 7,025,392 | B2 * | 4/2006 | Inoue et al. ................ | 285/340 |
| 7,316,429 | B2 * | 1/2008 | Viegener ................... | 285/340 |
| 7,396,053 | B2 * | 7/2008 | Webb et al. ................ | 285/369 |
| 7,399,005 | B2 * | 7/2008 | Rigollet et al. ............ | 285/420 |
| 7,490,866 | B2 * | 2/2009 | Webb et al. ................ | 285/340 |
| 2003/0042739 | A1 * | 3/2003 | Barbett et al. ............. | 285/340 |

FOREIGN PATENT DOCUMENTS

| | | |
|---|---|---|
| DE | 3635100 | 4/1988 |
| DE | 4040638 | 7/1991 |
| DE | 29814927 | 11/1998 |
| DE | 10009200 | 8/2001 |
| EP | 0211158 | 2/1987 |
| EP | 0 211 158 B1 | 5/1988 |
| EP | 1 440 270 B1 | 10/2002 |
| EP | 127 3842 | 1/2003 |
| WO | WO 03/033956 A1 | 4/2003 |
| WO | WO 03/071178 | 8/2003 |

\* cited by examiner

*Primary Examiner*—David E Bochna
(74) *Attorney, Agent, or Firm*—Whitham Curtis Christofferson & Cook, PC

(57) ABSTRACT

In the case of a pipe connection for connecting a first pipe end (1) to a second pipe end (6), with a sealing ring (13) sealing the intermediate space between the pipe ends (1, 6), and a tensible pipe clamp (14) which fits over the pipe ends (1, 6) and in which a toothed anchoring ring (9) is mounted, said anchoring ring pressing the toothed inside (10) of the anchoring ring (9) against the surface of an associated pipe end (6) when the pipe clamp (14) is tightened, simplified handling and a high compressive strength are achieved in that the first pipe end (1) is widened in a sleeve-shaped manner such that the second pipe end (6) can be pushed into the widened portion (2), in that the pipe clamp (14) has an internal contour which fits over the sleeve-shaped widened portion (2) of the first pipe end (1) in a form-fitting manner counter to a pull-out direction (A1) for releasing the pipe ends (1, 6) from each other, and in that the anchoring ring (9) is positioned to bear only against the second pipe end (6).

7 Claims, 1 Drawing Sheet

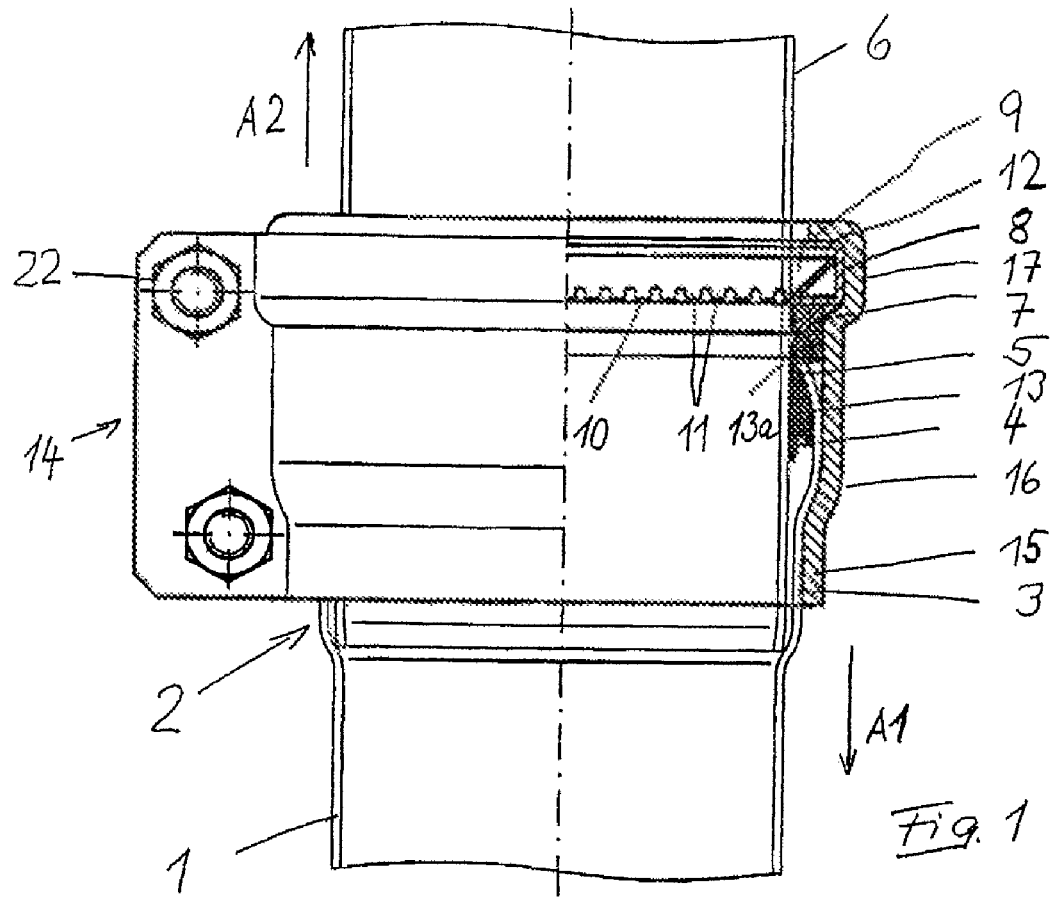
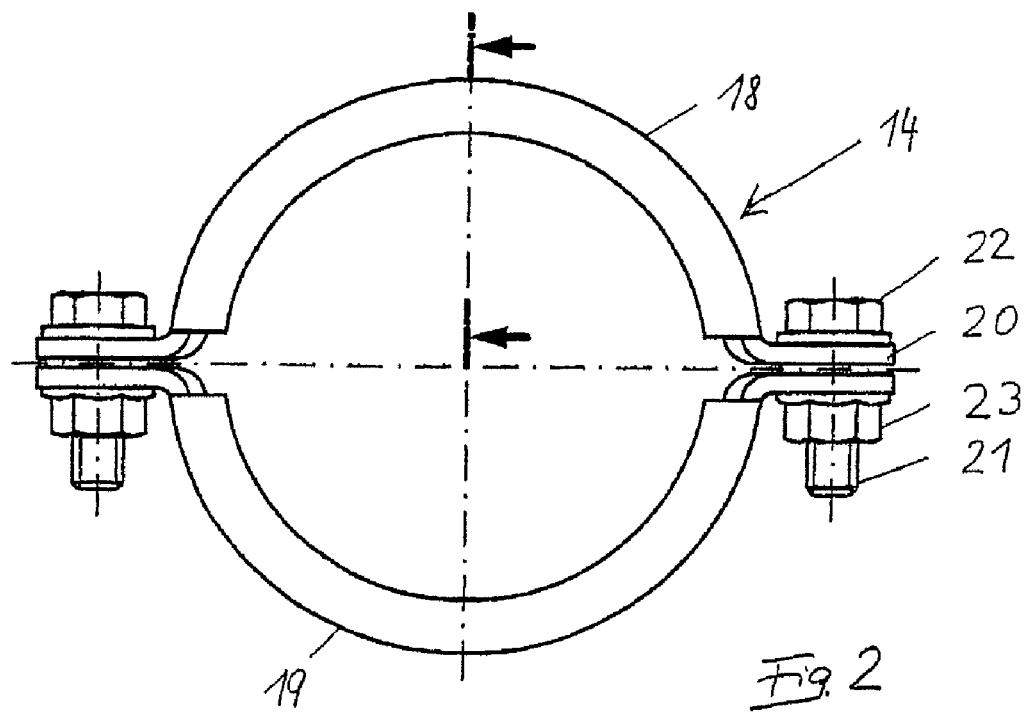

PIPE CONNECTION

BACKGROUND OF THE INVENTION

1. Field of the Invention

The invention relates to a pipe connection for connecting a first pipe end to a second pipe end, with a sealing ring sealing the intermediate space between the pipe ends, and a tensible pipe clamp which fits over the pipe ends and in which a toothed anchoring ring is mounted, said anchoring ring pressing the toothed inside of the anchoring ring against the surface of an associated pipe end when the pipe clamp is tightened.

2. Description of Related Art

Pipe connections of this type are used in particular whenever a pressure significantly deviating from the ambient pressure is produced in the interior of the pipe line. In the event of a positive pressure in the pipe line which comprises a plurality of pipe sections connected to one another via a pipe connection, there is the tendency for the pipes which are connected to one another by the pipe connection to be forced apart by the pressure of the fluid and for the connection between the pipe sections thus to be released.

A pipe connection of the type mentioned at the beginning is known by EP 0 211 158 B1. The pipe coupling described therein has a pipe clamp within which two pipe ends having the same diameter butt flush against each other, with the joint which is formed as a result being kept sealed by a seal which extends axially on both sides of the joint and has the pipe clamp pressing against it. For a frictional connection between the pipe clamp and the two pipe ends, an anchoring ring is located at both axial ends of the pipe clamp, said anchoring ring being positioned obliquely in relation to the pipe end and being pressed with an inner edge, which is provided with teeth, by the pipe clamp against the surface of the tube section such that the teeth are embedded somewhat into the surface of the pipe section in question.

A similar pipe connection, but with specially configured teeth of the anchoring ring, is known from EP 1 440 270 B1.

Pipe connections of this type have proved worthwhile as a connection which is pressure-resistant to a certain extent. However, the compressive strengths which can achieved are limited. Furthermore, the installation and handling of the pipe clamp with the two anchoring rings for the two pipe ends is not unproblematic, since careful tightening of the pipe clamp is required in order to ensure identical securing forces by means of the two anchoring rings.

SUMMARY OF THE INVENTION

The present invention is based on the object of designing a pipe connection of the type mentioned at the beginning in such a manner that it is simpler to handle and permits increased compressive strength.

To achieve this object, a pipe connection of the type mentioned at the beginning is characterized, according to the invention, in that the first pipe end is widened in a sleeve-shaped manner such that the second pipe end can be pushed into the widened portion, in that the pipe clamp has an internal contour which fits over the sleeve-shaped widened portion of the first pipe end in a form-fitting manner counter to a pull-out direction for releasing the pipe ends from each other, and in that the anchoring ring is positioned to bear only against the second pipe end.

The pipe connection according to the invention therefore manages with a single anchoring ring which acts on the second pipe end which is pushed into the sleeve-shaped widening of the first pipe end. The two pipe ends are therefore held together by the pipe clamp by means of form-fitting action on the first pipe end in the region of the sleeve-shaped widened portion and by means of frictional action by means of the anchoring ring at the smooth, wide pipe end, to be precise in the region which projects out of the first pipe end.

The holding of the first pipe end by the pipe clamp is relatively uncritical because the holding of the first pipe end in its position by the form-fitting connection with the sleeve-shaped widened portion does not critically depend on a certain contact pressure by means of the pipe clamp. Therefore, the tightening of the pipe clamp can be metered unproblematically such that the holding function by the anchoring ring is ensured.

In a preferred embodiment of the invention, the anchoring ring is mounted in a tensioning ring having a U-shaped cross section which is open towards the inside. The tensioning ring does not extend over the entire circumference of the pipe clamp, but rather has a gap such that it can be pressed together by the pipe clamp in order to tension it. The anchoring ring can be designed in a similar manner, but preferably comprises a ring with free, overlapping ends such that the anchoring ring can also be pressed together radially over the tensioning ring by the pipe clamp, and at the same time is provided over its entire circumference with teeth which act on the surface of the pipe end.

The anchoring ring is preferably mounted obliquely, to be precise preferably counter to the pull-out direction of the second pipe end, as arises when the second pipe end is pulled out of the first pipe end. The teeth of said anchoring ring are therefore arranged closer to the first pipe end than the radially outer base of the anchoring ring, which base is supported on the pipe clamp, said support on the pipe clamp preferably taking place via the tensioning ring.

A sealing ring and a shaped ring are preferably provided in order to seal the intermediate space between the two pipe ends, with the sealing ring fitting over the free edge of the sleeve-shaped widened portion of the first pipe section. The shaped ring is pressed radially inwards by the tensioning ring, to be precise at the joint which forms at the free edge of the first pipe section, after the second pipe section is pushed into the first pipe section. The sealing ring here bears directly against the shaped ring. Shaped ring and sealing ring are preferably shaped in a complementary manner with respect to each other at the mutually abutting edges.

In a structurally advantageous arrangement, the sealing ring is supported in the axial direction on the tensioning ring which is mounted on the anchoring ring.

The pipe clamp required for the pipe connection according to the invention preferably comprises two half shells which are connected to each other. In this case, the half shells can be connected in a hinged connection which makes it possible to open up the half shells in order to fit them over the pipe ends. However, the half shells may also be completely separable from each other and can be connected to each other, for example, by means of screws. In both embodiments, the pipe clamp is preferably closed and tensioned by tightening the half shells in relation to each other by means of a screw connection. The screw connection is preferably located on neck flanges of the half shells by a screw bolt being inserted through corresponding passage openings in the neck flanges and being clamped by means of a nut. One possible hinged connection of the half shells to each other can take place by inserting suitably shaped necks of the two half shells one inside the other. However, it is simpler also to provide additional flanges on the second side, which flanges are connected to each other by means of a screw connection.

The sleeve-like widened portion of the first pipe end preferably comprises, in a manner known per se, a cylindrical section which is expanded in relation to the pipe diameter of the pipe end upstream of the widened portion and merges into a tulip-shaped section which is expanded again in relation thereto and is terminated by a free edge which has a smaller diameter than the maximum diameter of the tulip-shaped section. In the case of such a design of the sleeve-shaped widened portion, the pipe clamp preferably fits around the transition from the cylindrically expanded section into the section widened in a tulip-shaped manner. The pipe clamp is preferably furthermore provided with a groove encircling it lengthwise at the end pointing to the second pipe end, into which groove the tensioning ring with its U-shaped cross section can be inserted.

BRIEF DESCRIPTION OF THE DRAWINGS

The invention will be explained in more detail below with reference to an exemplary embodiment which is illustrated in the drawing, in which:

FIG. 1 shows a view with a partial section of a pipe connection between two pipe ends;

FIG. 2 shows an axial top view of the pipe connection with an indication of the section line for FIG. 1.

DETAILED DESCRIPTION OF THE INVENTION

FIG. 1 shows a first pipe end 1 which is provided with a sleeve-shaped widened portion 2. The sleeve-shaped widened portion 2 comprises a cylindrical section 3 which has a somewhat enlarged diameter in comparison to the diameter of the pipe end 1 outside of the widened portion 2. The cylindrical section 3 is adjoined by a tulip-shaped section 4 which has a region which is widened once again in relation to the cylindrical section 3, and is terminated by a radially inwardly directed free edge 5. The diameter of the free edge 5 approximately corresponds to the diameter of the cylindrical section 3.

A second, smooth pipe end 6 is pushed into the sleeve-shaped widened portion 2. Before the second pipe end 6 is pushed in, a shaped ring 7, a tensioning ring 8 in the form of a radially inwardly open U-shaped profile and an anchoring ring 9 are pushed onto it. The anchoring ring 9 is mounted in the tensioning ring 8. At its edge 10 pointing towards the first pipe end 1, the tensioning ring 9 has teeth 11 which are spaced apart uniformly and, in the fitted state, bear under pressure against the surface of the second pipe end 6. The anchoring ring 9 extends obliquely radially outwards from the edge 10 and is supported by a smooth edge 12 against the base of the tensioning ring 8.

At its end pointing towards the first pipe end 1, the shaped ring 7 is designed in a complementary manner to a profiled sealing ring 13 which is shaped in order to receive the free edge 5 of the first pipe end 1. The sealing ring 13 fits with a triangular bead 13a over the free edge 5 of the first pipe end 1 and bears at its other end over an axial length against the second pipe end 6. It is shaped in such a manner that it is thickened towards its free end such that it is pressed radially inwards against the second pipe end 6 by the tulip-shaped section 4.

The sealing ring 13 is held in its position even at high pressure by means of the shaped ring 7 against which it bears.

The pipe connection is secured by a tensible pipe clamp 14 which, in the fitted and tensioned state, bears with a cylindrical section 15 against the cylindrical section 3. The pipe clamp 14 has a cylindrical widened portion 16 in which the tulip-shaped section 4 of the first pipe end 1 can be accommodated. The widened cylindrical section 16 merges into an end section 17 which forms an annular, radially inwardly open groove for receiving the tensioning ring 8.

As FIG. 2 shows, the pipe clamp 14 is formed by two half shells 18, 19 which are each provided at their ends with radially outwardly protruding neck flanges 20. The neck flanges 20 are provided with passage holes (not illustrated) through which a bolt 21 of a screw 22 can be inserted. The pipe clamp 14 is tensioned by means of a nut 23 which can be screwed onto the screw bolt 21 on the side opposite the screw head 22.

FIG. 2 shows that the screw connection of the neck flanges 20 belonging to each other takes place by means of two screws 22 in each case.

The tensioning of the pipe clamp 14 causes the tensioning ring 8 to be pressed radially inwards. As a result, the anchoring ring 9 with the teeth 11, which bear against the circumference of the smooth, second pipe end 6, is also pressed radially inwards, as a result of which the teeth 11 interlock in the surface of the second pipe end 6. The shaped ring 7 bears in a sealing manner with a radially inner surface flat against the second pipe end 6 directly below the teeth 11 of the anchoring ring 9 and holds the sealing ring 13 bearing against it.

It can be seen that, in the case of this pipe connection, the first pipe end 1 is prevented by the form-fitting connection of the pipe clamp 14 from being displaced in its pull-out direction A1 which would bring about release of the connection between the first pipe end 1 and the second pipe end 6.

The second pipe end 6 is prevented from moving in its pull-out direction A2, which would correspondingly cause the second pipe end 6 to be pulled out of the first pipe end 1, by means of the anchoring ring 9 which is positioned obliquely in a barb-like manner and the teeth 11 of which press into the surface of the second pipe end 6.

The pipe connection is therefore prevented from being released on the part of the first pipe end 1 by means of a form-fitting connection which is formed by the transition of the sections 15, 16 of the pipe clamp 14 in conjunction with the cylindrical section 3 and the adjoining, tulip-shaped section 4 of the first pipe end 1, and on the part of the second pipe end 6 by means of the frictional connection via the teeth 11 of the anchoring ring 9.

The pipe connection according to the invention permits a simple and, because of the form-fitting connection, also precise positioning of the pipe clamp 14. By means of the sleeve-like widened portion 2 of the first pipe end, precise positioning of the second pipe end 6 relative to the first pipe end 1 is also ensured, since the second pipe end 6 can be pushed in to the first pipe end 1 until it comes to a stop. The pipe clamp 14, which is preferably of two-part design, can subsequently be applied unproblematically, with the components pushed on beforehand, the shaped ring 7 and tensioning ring 8 with the anchoring ring 9 inserted therein, being correctly positioned unproblematically by means of the corresponding shaping of the pipe clamp 14. This is also assisted by the shaped ring 7 bearing with a smooth bearing surface against the axially adjacent profiled side wall of the tensioning ring 8. The correct positioning of the sealing 13 is ensured in that it is pushed onto the free edge 5 of the first pipe end 1, which it fits over, before the pipe ends 1, 6 are plugged together.

The pipe connection according to the invention is suitable for high pressure loading and reliably withstands said pressure loading.

The invention claimed is:

1. A pipe connection comprising:

a first pipe end, which is widened in a sleeve-like manner so as to form a widened portion;

a second pipe end pushed into the widened portion of the first pipe end;

a tensible pipe clamp which fits over the pipe ends and which has an internal contour so as to fit over the widened portion of the first pipe end in a form-fitting manner counter to a pull-out direction for the first pipe end from the second pipe end;

a tensioning ring mounted within the tensible clamp and having a U-shaped cross-section which is open towards the radial inside a toothed anchoring ring having a toothed inside mounted in the tensioning ring and pressing its teeth inside against the surface of the second pipe end when the pipe clamp is tightened, wherein a sealing ring is profiled so as to fit over the free edge of the first pipe end, and a shaped ring holds the sealing ring in its position by having a complementary shape to the sealing ring bearing against the shaped ring which shaped ring is supported in the axial direction by the tensioning ring.

2. The pipe connection according to claim 1, wherein the anchoring ring is mounted obliquely to the pull-out direction of the second pipe end from the first pipe end.

3. The pipe connection according to claim 1, wherein the widened portion of the first pipe end has a cylindrical section which is expanded in relation to the pipe diameter of the pipe end upstream of the widened portion and merges into a tulip-shaped section which is expanded again in relation thereto and is terminated by a free edge which has a smaller diameter than the maximum diameter of the tulip-shaped section.

4. The pipe connection according to claim 1, wherein the pipe clamp comprises two half shells which are connected to each other.

5. The pipe connection according to claim 4, wherein the half shells have neck flanges which are pulled towards each other by means of a screw connection in order to close the pipe clamp.

6. The pipe connection according to claim 5, wherein each screw is formed by two screws.

7. The pipe connection according to claim 5, wherein the half shell each have two neck flanges which are pulled against the neck flanges of the other half shell by means of a screw connection.

* * * * *